United States Patent
Kimura et al.

[15] 3,681,392
[45] Aug. 1, 1972

[54] FLUORAN COMPOUNDS

[72] Inventors: Shiro Kimura; Teruo Kobayashi; Sadao Ishige, all of Kanagawa, Japan

[73] Assignee: Fuji Photo Film Co., Ltd., Kanagawa, Japan

[22] Filed: April 16, 1970

[21] Appl. No.: 29,272

[30] Foreign Application Priority Data

April 17, 1969 Japan..........................44/29836

[52] U.S. Cl..................................260/335, 106/287
[51] Int. Cl. ................................C07d 7/42
[58] Field of Search.........................260/335

[56] References Cited

UNITED STATES PATENTS 3,442,908    5/1969    Orita et al.....................260/335

*Primary Examiner*—Norma S. Milestone
*Attorney*—Sughrue, Rothwell, Mion, Zinn & Macpeak

[57] ABSTRACT

3-Dialkyl-7-phenylfluoran compounds, having the formula,

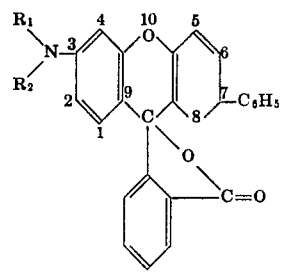

wherein $R_1$ and $R_2$ each represents an alkyl group having from one to five carbon atoms, and a process for their preparation are disclosed. The 3-dialkyl-7-phenyl fluoran compounds are useful in pressure-sensitive and heat-sensitive copying papers.

1 Claim, No Drawings

FLUORAN COMPOUNDS

FIELD OF THE INVENTION

This invention relates to a process for the preparation of a novel fluoran compound.

DESCRIPTION OF THE INVENTION

More particularly, the invention relates to a process for preparing a 3-dialkylamino-7-phenyl-fluoran having the formula III by reacting an o-(4-dialkylamino-2-hydroxybenzoyl)benzoic acid having the formula I and p-phenylphenol having the formula II:

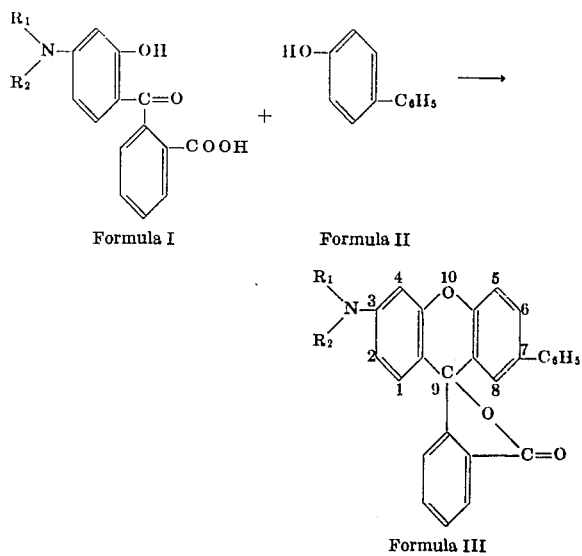

Formula I    Formula II

Formula III wherein $R_1$ and $R_2$ each represents an alkyl group having from one to five carbon atoms.

DETAILED DESCRIPTION OF THE INVENTION

The fluoran compound of the formula III prepared by the process of this invention is almost colorless but when the compound is brought into contact with an electron acceptor material such as a solid acid, for example, bentonite, zeolite, acid clay, and magnesium trisilicate, or an acidic organic material, for example, benzoic acid, benzene sulfonic acid, or naphthol, the compound is immediately colored red. Further, before the fluoran compound of the formula III is brought into contact with the electron acceptor material, the compound is stable to atmosphere and light and is neither colored nor decomposed when the compound is exposed to atmosphere or light. Also, the dye formed by the contact of the fluoran compound and the electron acceptor material is quite fast. Thus, such a compound is very useful as a color former (dye precursor) for use in pressure-sensitive copying papers or heat-sensitive copying papers.

The fluoran compound of the formula III is prepared by reacting an o-(4-dialkylamino-2-hydroxybenzoyl)benzoic acid and p-phenylphenol in the presence of a condensing agent. Suitable condensing agents are sulfuric acid (about 50 to 98%), phosphorus pentoxide, polyphosphoric acid, and zinc chloride.

The following examples are given to illustrate the invention without limiting the spirit and scope of the invention.

EXAMPLE 1

15.7 g of o-(4-diethylamino-2-hydroxybenzoyl)benzoic acid and 8.5 g of p-phenylphenol were dissolved in 30 cc of 85% of sulfuric acid and they were reacted for 3 hours with heating. The reaction product liquid was poured into ice water and the salt of the dye, thus deposited, was neutralized with an aqueous sodium hydroxide solution. The neutralized product was then dissolved in toluene and be concentrating the toluene solution under a reduced pressure after washing it with water, 14.0 g of the almost colorless crystals of 3-diethylamino-7-phenylfluoran having a melting point of 216°–218° C. was obtained.

EXAMPLE 2

13.5 g of o-(4-dimethylamino-2-hydroxybenzoyl)benzoic acid and 8.5 g of p-phenylphenol were treated by the same procedure as used in Example 1. 13 g of the almost colorless crystals of 3-dimethylamino-7-phenylfluoran was obtained. The melting point of the crystals was 277°–279° C. When the compound was dissolved in 98% acetic acid, the solution was red and the $\lambda_1$ and $\mu_2$ thereof were 501 $\mu$ and 535 $\mu$ respectively.

What is claimed is:

1. A 3-dialkylamino-7-phenylfluoran compound having the formula

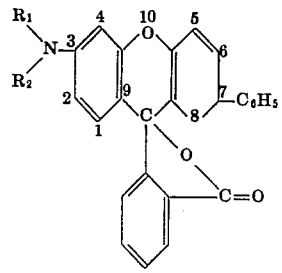

wherein $R_1$ and $R_2$ each represents an alkyl group having from one to five carbon atoms.

* * * * *